Oct. 6, 1953 B. E. DENTON 2,654,855
AUTOMATIC CONTROL FOR WAVE FORM
Filed May 28, 1949
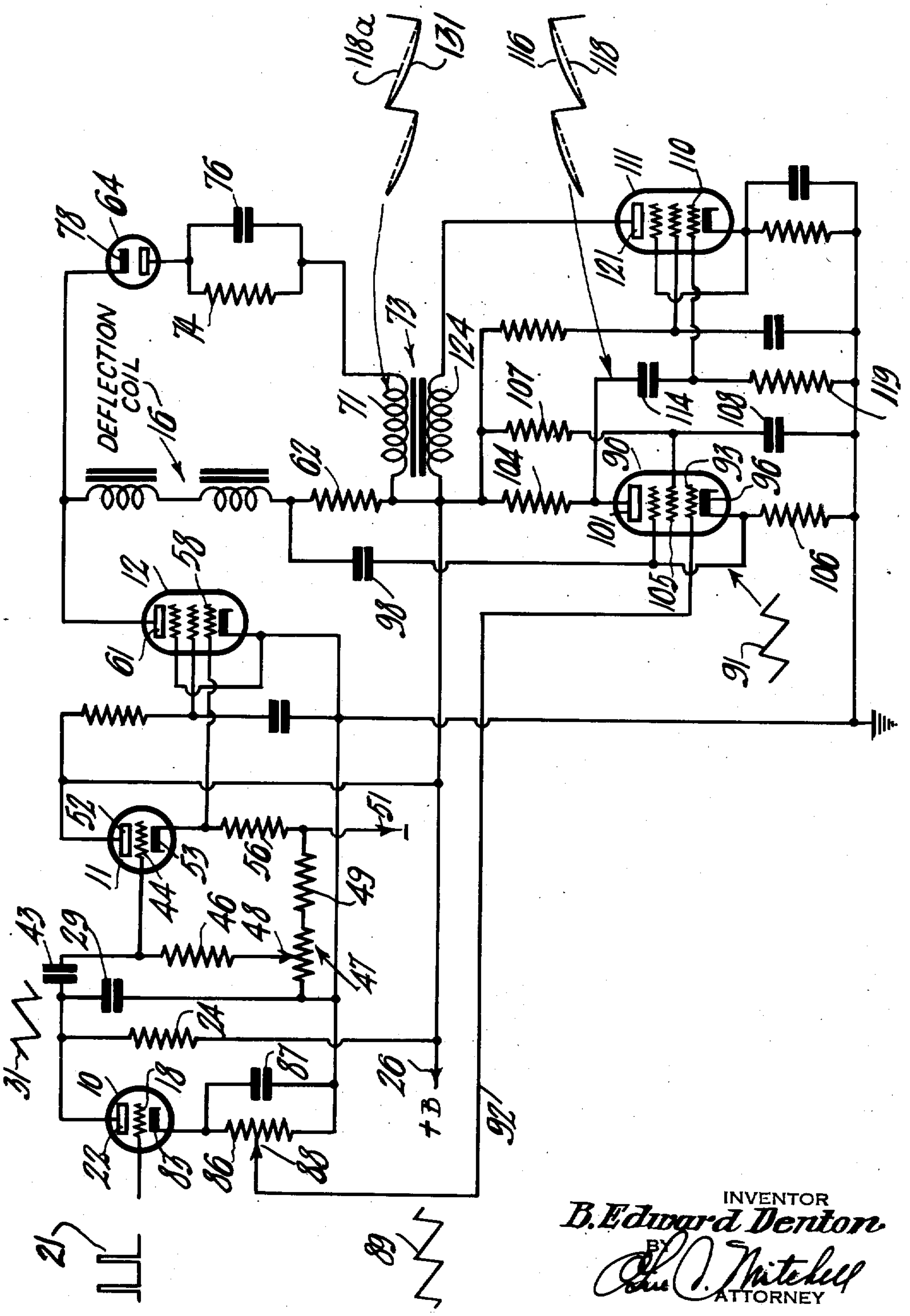
INVENTOR
B. Edward Denton
BY
ATTORNEY Patented Oct. 6, 1953 2,654,855

UNITED STATES PATENT OFFICE 2,654,855

AUTOMATIC CONTROL FOR WAVE FORM

Bethel Edward Denton, Merchantville, N. J., assignor to Radio Corporation of America, a corporation of Delaware Application May 28, 1949, Serial No. 96,113

6 Claims. (Cl. 315—27)

The present invention relates to systems for maintaining a desired wave form of a wave applied to the deflection of the cathode ray beam in a cathode ray tube, and, more particularly, but not necessarily exclusively, to novel automatic control systems which function to maintain the desired wave form of a high frequency deflection wave. The system of the present invention is especially applicable to high frequency television deflection circuits. A television deflection circuit embodying the invention will automatically provide control of the linearity of the deflection wave.

The principal object of the present invention is to obtain a wave form restoring effect in a novel manner with the aid of a transformer and associated components.

Another object of the invention is to provide a novel system including a transformer for employing a differential signal which is effective in accordance with the invention for maintaining linearity of deflection of the cathode ray beam in a cathode ray tube.

A further object of the invention is to provide a novel arrangement including a damper tube and the secondary winding of a transformer for automatically maintaining the wave form of the deflection wave in a reactance controlled deflection circuit associated with a cathode ray tube.

Other objects and advantages of the invention will, of course, become apparent and immediately suggest themselves to those skilled in the art to which the invention is directed from a reading of the following specification in connection with the accompanying drawing which shows, diagrammatically, cathode ray beam deflecting apparatus embodying the invention.

Referring to the single figure of the drawing, there is shown, by way of example, a deflection circuit for deflecting the cathode ray beam of a cathode ray tube (not shown) along one axis, for example, the horizontal axis. Another similar deflection circuit (not shown) may be employed to produce deflection along an axis at right angles to the first axis thereby to produce a scanning raster in a well-known manner. Arrangements, generally similar to that shown herein by way of example, are disclosed in Patent No. 2,101,520, granted December 7, 1937 to W. A. Tolson, and Tolson Reissue Patent No. 20,338, dated April 20, 1937.

The deflection circuit selected by way of example as a convenient setting for the present invention, although the invention is not limited in use to circuits of this type, comprises a discharge tube 10, a cathode follower tube 11, a power tube 12, and deflection coils 16. The coils 16 may be incorporated in a deflection yoke for use with a cathode ray tube (neither shown).

The grid 18 of the discharge tube 10 is connected through any suitable coupling means to a source (not shown) of sharp pulses 21 of positive polarity. This source of pulses may be a blocking oscillator as shown in either of the Tolson patents mentioned above.

The anode 22 of the discharge tube 10 is connected through a charging resistor 24 to a suitable source of positive voltage (not shown) as indicated schematically at 26. The voltage supply source may be the usual B supply source generally associated with electronic equipment. Resistor 24 may be variable if desired to provide a control for the deflection amplitude.

A condenser 29 is charged in series with the resistor 24 from the connection 26 while the tube 10 is substantially cut off. A sawtooth voltage will appear across the condenser 29 since this condenser is discharged periodically by the tube 10 on the occurrence of a pulse 21. The developed voltage wave is shown conventionally and is designated by reference character 31.

The voltage wave 31, developed as a result of the operation of the tube 10, is applied through a coupling condenser 43 to the grid 44 of the cathode follower tube 11. The grid resistor 46 of the tube 11 is returned to the adjustable contact 48 of a potentiometer 47. This potentiometer may be used to adjust the operating level of the grid 44 of the tube 11 and through this its cathode 53, thereby controlling the drive on element 58 of tube 12. The resistor of the potentiometer 47 is connected in series with a second resistor 49, this series combination being connected between a negative bias source (not shown), as indicated schematically at 51, and ground. The anode 52 of the tube 11 is, or may be, directly connected to the source of positive potential indicated schematically at 26. As mentioned above, the tube 11 is connected as a cathode follower and its cathode 53 is connected to the negative potential source, as indicated at 51 through a cathode resistor 56. The control grid 58 of the power tube 12 is directly connected to the cathode 53 of the tube 11 so that the sawtooth voltage 31 is applied to the grid 58 in a positive direction from a low impedance source, which permits driving the control grid 58 into grid current when desired.

The tube 12 is a power tube and is preferably a pentode, as shown, and it serves to drive a sawtooth of current through the deflection coils 16 when the voltage wave form 31, for example, is applied to its grid 58. It will be understood that this wave form may be modified to suit the characteristics of the deflection circuit which includes the deflecting coils 16. For example, "high peaking" may be employed by including a pulse component in a well-known manner. The anode 61 of the power tube 12 is connected through the deflection coil 16 and a resistor 62 to the source of positive potential indicated at reference character 26.

A damper tube, for example the diode 64 or an equivalent unilaterally conducting device, is connected in series with the secondary 71 of a transformer 73. This series circuit may include a resistor-condenser combination composed of a resistor 74 and a condenser 76. The cathode 78 of the tube 64 is connected to the anode 61 of the tube 12 and to one end of the coil or coils 16. The damper tube, the transformer secondary 71 and the resistor-condenser combination are connected effectively across the deflection coil 16 and the resistor 62 in the illustrative arrangement since, as shown, the coil 16 and the transformer secondary 71 are connected to the point 26. The coil 16 is connected thereto through the resistor 62.

A circuit employing a damper tube is disclosed in U. S. Reissue Patent No. 21,400, granted March 19, 1940. A complete discussion of magnetic deflection will be found in the RCA Review for September 1947, beginning at page 506. The manner in which the transformer 73 functions in accordance with present invention to correct the wave form of deflection will be described hereinafter in detail.

The cathode 83 of the tube 10 is returned to ground through a cathode resistor 86 which is shunted by a condenser 87. This combination serves to supply a sawtooth wave form to correct polarity and adequate amplitude. The resistor 86 serves as a potentiometer resistor, and the movable contact 88 of the potentiometer provides a connection for obtaining a sawtooth of voltage of desired amplitude indicated conventionally at 89, which is reversed in phase with respect to the sawtooth 31. A wave comparison or mixer tube 90 serves to compare this sawthooth of voltage 89 with the sawtooth of voltage 91 which is obtained from the resistor 62. The latter is an indication of the wave form of the deflection current in the deflection coils 16 so that the tube 90 will function as a wave comparison tube. The wave 89 is applied over a conductor 92 to the grid 93 of the tube 90. The wave form of voltage, shown conventionally at 91, is applied from the resistor 62 to the cathode 96 of the tube 90 by way of a coupling condenser 98. Waves 89 and 91 have the same phase relationship but they may be considered as being applied effectively in opposite phase relationship to the comparison device. The anode 101 of the tube 90 is connected through a resistor 104 to the source of positive potential indicated schematically at 26. The cathode 96 of the tube 90 is connected to a reference point in the circuit, such as ground, through a resistor 106. The screen grid 105 is connected to the source indicated at 26 by way of a resistor 107 bypassed by a condenser 108.

The cathode 96 of the tube 90, being in phase with the grid 93, allows plate current to flow according to differences in the respective slopes of the original or standard signal 89 and the comparison signal 91. The output from the tube 90 is coupled to the signal grid 110 of a tube 111 by way of a coupling condenser 114. The signal output of the tube 90 which appears at the grid 110 of the tube 111 is indicated conventionally at 116. If the wave form 91 is less in amplitude than the wave form 89, the amplified difference will be represented by the curve 116. The dotted line 118 indicates generally the wave form of the wave 89 and the solid line curve is the amplified difference between it and the wave 91. It will be understood that the dotted line 118 is in effect the axis of the curve 116 and that the curve 116 may be positive with respect to this axis, as shown, or negative. In general, there will be a sawtooth component in addition to the correction component 116 which is indicated as a curved line.

A grid resistor 119 is provided for the signal grid 110. The anode 121 of the tube 111 is connected through the primary 124 of the transformer 73 to the same source of positive high potential, for example, as that indicated at reference character 26.

In operation of the apparatus shown illustratively as embodying the present invention, any change in current distribution through the deflection coil 16 will result in a corresponding change in the wave form 91. This will alter the shape of the curved portion 116 of the wave which appears in the output of the tube 90. This wave, as pointed out above, will have a sawtoth component in addition to the correction component 116. The current in the transformer primary is substantially a replica in wave form of the voltage wave 116. The connections from the transformer secondary 71 are made so that the resulting wave at its terminals has the polarity indicated by the curve 131. During the retrace of flyback the condenser 76 is charged to some value of voltage. The magnitude of this voltage charge is determined by the deflection amplitude, the time of cutoff of the tube 12 and other factors. Then, immediately the condenser 76 starts to discharge, at the beginning of trace, and the exponential discharge rate is retarded by the degree of conduction in the tube 64. The rate of discharge is partially controlled by the wave form of the curve 131 which appears on the secondary 71 of the transformer 73. If the negative amplitude of the curve 131 increases, it can be seen that the rate of discharge of the condenser 76 is retarded since the anode of the tube 64 is less positive. The converse will be true as the negative amplitude of the curve 131 is less or if its amplitude is positive with respect to the line 118a.

What is claimed is:

1. A system for maintaining a desired wave form comprising an electric wave source, a utilization circuit for said wave coupled to said source and comprising a branch circuit which includes a transformer secondary and a damper tube, a wave comparison device comprising an electronic amplifier having a plurality of terminals, means for applying an electric wave from said wave source to a terminal of said amplifier, means for applying a wave from said utilization circuit to another terminal of said amplifier in the same phase relationship as the wave applied from said wave source, said comparison device having means for deriving a differential effect, and means comprising the primary of said transformer for applying said differential effect to the branch circuit of said utilization circuit to offset a departure in the waveform appearing in said utilization device from the waveform supplied by said electric wave source.

2. A system for maintaining a desired waveform comprising an electric wave source, a utilization circuit coupled to said wave source comprising a branch circuit which includes a condenser, a wave comparison device, means for applying an electric wave from said wave source to said comparison device, means for applying a wave from said utilization circuit to said comparison device effectively in opposite phase relationship to the wave applied from said wave source, said comparison device having means for deriving a differential effect, an amplifier for amplifying said effect, a transformer comprising a primary winding and a secondary winding, the output of said amplifier being connected to the primary of said transformer, the secondary of said transformer being included in said branch circuit of said utilization circuit to offset a departure in the waveform appearing in said utilization device from the waveform supplied by said electric wave source.

3. A system for maintaining a desired waveform comprising an electric wave source, a utilization circuit coupled to said wave source comprising a branch circuit which includes a parallel resistor-condenser combination, a wave comparison device comprising a tube having a cathode, an anode and a control electrode, means for applying an electric wave from said wave source to the control electrode of said tube, means for applying a voltage wave from said utilization circuit to the cathode of said tube, said comparison device thereby operating to provide a differential effect, and means comprising a transformer for applying said differential effect to the branch circuit of said utilization circuit to offset a departure in the waveform appearing in said utilization device from the waveform supplied by said electric wave source.

4. A system for maintaining a desired wave form comprising an electric wave source, an inductive utilization circuit coupled to said source and comprising an inductive coil for said wave, a damper circuit for said coil comprising a unilaterally conductive device and a resistor-condenser combination, a wave comparison device, means for applying an electric wave from said wave source to said comparison device, means for applying a wave from said utilization circuit to said comparison device effectively in opposite phase relationship to the wave applied from said wave source, said comparison device having means for deriving a differential signal, means for amplifying said differential signal, means comprising a transformer having a secondary in said damper circuit for applying said differential signal to an electrode of said unilaterally conductive device to offset a departure in the wave form appearing in said utilization device from the waveform supplied by said electric wave source.

5. A system for maintaining a desired waveform comprising an electric wave source, a utilization circuit for said wave comprising a branch circuit said branch circuit including a unilaterally conductive device and a resistor-condenser combination, means for coupling said source to said utilization circuit a wave comparison device, means for applying an electric wave from said wave source to said comparison device, means for applying a wave from said utilization circuit to said comparison device, said comparison device thereby operating to provide a differential effect, and means comprising a transformer having a secondary in said branch circuit for applying said differential effect to the branch circuit of said utilization circuit to offset a departure in the waveform appearing in said utilization device from the waveform supplied by said electric wave source.

6. A deflection system for deflecting the cathode ray beam of a cathode ray tube comprising a sawtooth wave generator, a deflection coil, a damper tube for said coil, a driver tube for driving a beam deflecting current through said coil, a cathode follower amplifier for coupling said sawtooth wave generator to said driver tube, means for coupling said tube to said coil, a wave comparison device comprising electronic tube means, a pair of electrodes associated with said tube means, each electrode being effective to control current flow through said tube means, means for applying an electric wave from said sawtooth wave generator to one of said electrodes, means for obtaining a voltage wave representation of the current wave in said coil, means for applying the obtained voltage wave to the other of said electrodes, said comparison device having means for supplying a differential effect, and means comprising a transformer having a secondary in series with said damper tube for applying said differential effect to said damper tube.

B. EDWARD DENTON.

References Cited in the file of this patent

UNITED STATES PATENTS

| Number | Name | Date |
|---|---|---|
| 2,396,476 | Schade | Mar. 12, 1946 |
| 2,466,537 | De Vore | Apr. 5, 1949 |